United States Patent
Govea et al.

(10) Patent No.: US 10,709,003 B2
(45) Date of Patent: Jul. 7, 2020

(54) ELECTROSTATIC SHOCK AVOIDANCE SYSTEM FOR A VEHICLE

(71) Applicant: ContiTech USA, Inc., Fairlawn, OH (US)

(72) Inventors: Rodolfo Lopez Govea, Tlaquepaque (MX); Mario Alberto Recinos Silva, Zapopan (MX); Cesar Alejandro Hernandez Navarro, Tlaquepaque (MX); Lesly Guzman Duran, Zapopan (MX)

(73) Assignee: ContiTech USA, Inc., Hannover (DE)

( * ) Notice: Subject to any disclaimer, the term of this patent is extended or adjusted under 35 U.S.C. 154(b) by 259 days.

(21) Appl. No.: 15/841,329

(22) Filed: Dec. 14, 2017

(65) Prior Publication Data
US 2019/0191537 A1     Jun. 20, 2019

(51) Int. Cl.
*H05F 3/02* (2006.01)
*B60R 13/08* (2006.01)
*B60N 2/58* (2006.01)
*B60R 13/02* (2006.01)

(52) U.S. Cl.
CPC ................ *H05F 3/02* (2013.01); *B60N 2/58* (2013.01); *B60R 13/02* (2013.01); *B60R 13/08* (2013.01); *B60R 2013/0287* (2013.01)

(58) Field of Classification Search
CPC ........... H05F 3/02; B60R 13/02; B60R 13/08; B60R 2013/0287; B60N 2/58
USPC ....................................................... 361/217
See application file for complete search history.

(56) References Cited

U.S. PATENT DOCUMENTS

| | | |
|---|---|---|
| 2,858,482 A | 10/1958 | Nutter |
| 3,378,726 A | 4/1968 | Lankow |
| 4,630,867 A | 12/1986 | Gulliver |
| 5,825,605 A | 10/1998 | Sutherland |
| 7,569,947 B2 | 8/2009 | Imai et al. |
| 2008/0246296 A1 | 10/2008 | McQueen et al. |
| 2011/0273814 A1* | 11/2011 | McEnhill ................ B60R 16/06 361/216 |
| 2017/0057389 A1 | 3/2017 | Dickerman |

* cited by examiner

*Primary Examiner* — Dharti H Patel
(74) *Attorney, Agent, or Firm* — Gregory Adams; David L. Cate

(57) ABSTRACT

An electrostatic shock reduction system for a vehicle. At least one surface of the interior or exterior of the vehicle which a user touches includes a conductive material and forms a conductive surface. A discharge circuit is connected to the conductive surface. The discharge surface is configured to slowly discharge the user when the user contacts the conductive surface so as to prevent an electrostatic shock to the user or an object approached by the user.

19 Claims, 4 Drawing Sheets

ELECTROSTATIC SHOCK AVOIDANCE SYSTEM FOR A VEHICLE

FIELD

The field to which the disclosure generally relates are systems for avoiding electrostatic shock events for an occupant of a vehicle or an individuals entering or exiting a vehicle.

BACKGROUND

This section provides background information to facilitate a better understanding of the various aspects of the disclosure. It should be understood that the statements in this section of this document are to be read in this light, and not as admissions of prior art.

A driver or passenger of a vehicle often has an opposite electrical charge than that of the vehicle. As a result, a person exiting or entering a vehicle may be subject to an electrostatic shock. These electrostatic shock events can cause discomfort to people, damage electronic devices or components, and cause fires when in the presence of flammable or combustible material such as at a gas station. Electrostatic discharge (ESD) can arise when two surfaces having a large electric potential difference equalize quickly or instantaneously.

In the context of a vehicle, a person sitting in the vehicle may become electrostatically charged which can cause the person to be subject to an electrostatic shock when making contact with ground. For example, sliding across the vehicle seat when exiting the vehicle may cause a person to develop a static charge. When subsequently coming into close proximity or in contact with an electric conductor, for example a path to ground, there can be a rapid electro-static discharge. The rapid electro-static discharge can cause discomfort to the person, damage to electronics and, as noted above, create dangerous situations at gas stations, for example, when an individual with a static charge reaches for the nozzle of the fuel pump.

In order to avoid electrostatic shocks when entering or exiting a vehicle, people have resorted to static guard sprays which need to be applied to surfaces of the vehicle so as to avoid a user from developing a static charge. Another method employed to avoid electrostatic shocks includes the occupants of a car placing their hands on the outer chassis of the vehicle while exiting the car.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In some aspects of the disclosure, electrostatic shock avoidance systems are provided to prevent or minimize electrostatic shock events for users of vehicles. The object can, for example, be achieved by an electrostatic shock reducing system for a vehicle having a plurality of surfaces contactable by a user, where the electrostatic shock reducing system includes a conductive material, at least one of the plurality of surfaces being made of the conductive material so as to form a conductive surface, and a discharge circuit connected between ground and the conductive surface. The discharge circuit is configured to slowly discharge the user to the ground when the user contacts the conductive surface.

In some cases at least one of the plurality of surfaces is an interior surface of the vehicle. The vehicle may include at least one of a steering wheel, a seat, a door, a shift stick, and a door handle, and the conductive surface may be arranged on at least one of the at least one of a steering wheel, a seat, a door, a shift stick, and a door handle. In some other cases, the vehicle includes at least one of a keyhole and an outer surface, and the conductive surface is arranged on at least one of the at least one of a keyhole and an outer surface.

In some embodiments, the discharge circuit further comprises a resistor array with dissipative material and/or active components. Also, the conductive surface may be arranged at a location which the user is likely to contact while seated, while entering or while exiting the vehicle.

In some other aspects of the disclosure, the objective can, by further example, be achieved by an electrostatic shock reducing system for a vehicle having a plurality of surfaces contactable by a user, the electrostatic shock reducing arrangement including a conductive material arranged on at least one of the plurality of surfaces so as to form a conductive surface, and a discharge circuit connected between ground and the conductive surface. The discharge circuit is configured to slowly discharge the user when said user contacts said conductive surface.

In yet other aspects of the disclosure, the objective can, by further example, be achieved by a vehicle including a plurality of surfaces contactable by a user, where at least one of the plurality of surfaces includes a conductive material so as to form a conductive surface, a ground, and a discharge circuit connected between the ground and the conductive circuit. The discharge circuit is configured to slowly discharge the user when the user contacts the conductive surface.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. While the materials used in the present disclosure are described herein as comprising certain components, it should be understood that the materials could optionally comprise two or more chemically different materials. In addition, the materials can also comprise some components other than the ones already cited. In the summary of the disclosure and this detailed description, each numerical value should be read once as modified by the term "about" (unless already expressly so modified), and then read again as not so modified unless otherwise indicated in context.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Figure 1:
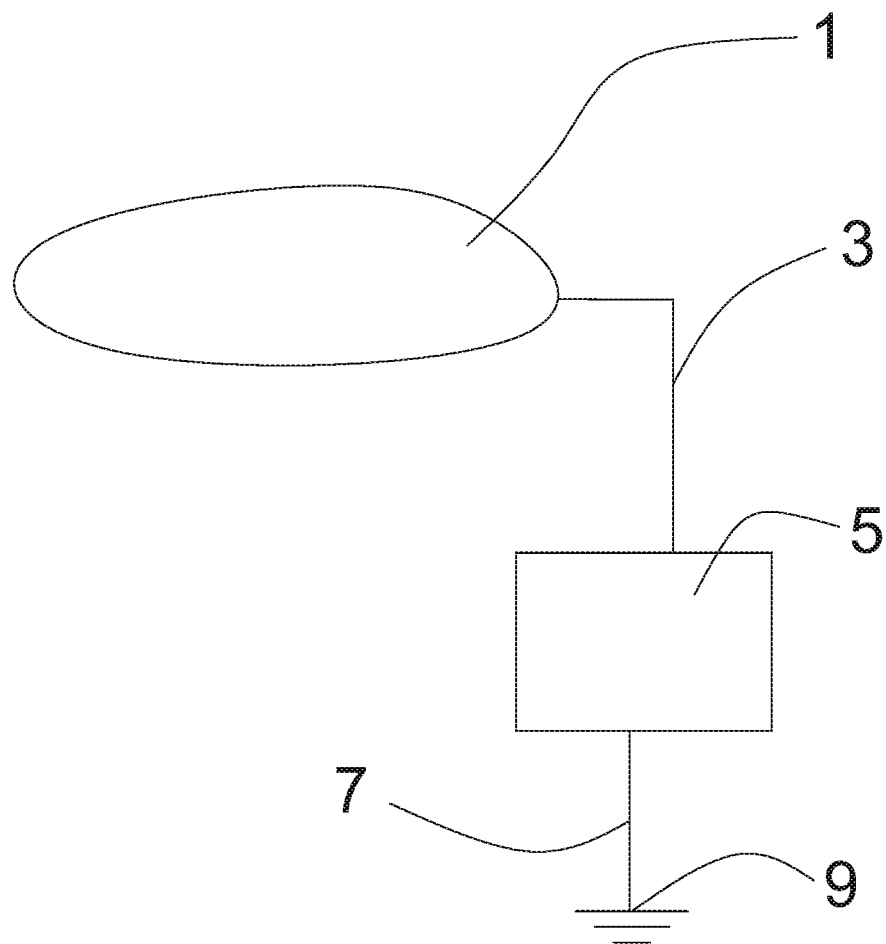
FIG. 1 is a schematic of a system for discharging a static electric charge of a user.

FIG. 1 shows a conductive surface 1. The conductive surface 1 can, for example, be an interior surface in a vehicle such as a seat covering, a steering wheel covering, an arm rest, door panel, interior door handle, a shift stick, an arm rest and the like. The conductive surface 1 may also be disposed on the exterior of the vehicle, for example, on the door handle, at a keyhole, or another outer surface of the door.

The conductive surface 1 includes a conductive material and is connected to a dissipative circuit 5 via a connecting line 3. The dissipative circuit 5 can be connected to the vehicle's ground 9 via a further connecting line 7. The dissipative circuit 5 is configured to function as an electrostatic discharge circuit such that when a person who is charged contacts the conductive surface 1, the electrostatic charge dissipates slowly to the vehicles ground 9 via the electrostatic discharge circuit 5. The dissipative circuit can, for example, be a resistor array with dissipative material and/or include active components. As a result of the charge dissipating slowly via the dissipative circuit 5, the discomfort experienced by a person as a result of a sudden electrostatic shock can be avoided.

Figure 2:
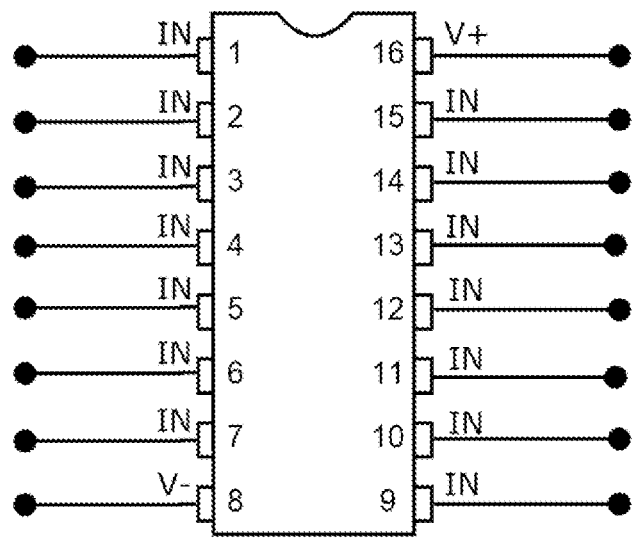
FIG. 2 shows an exemplary embodiment of an electrostatic discharge circuit in the form of an integrated circuit.
Figure 3:
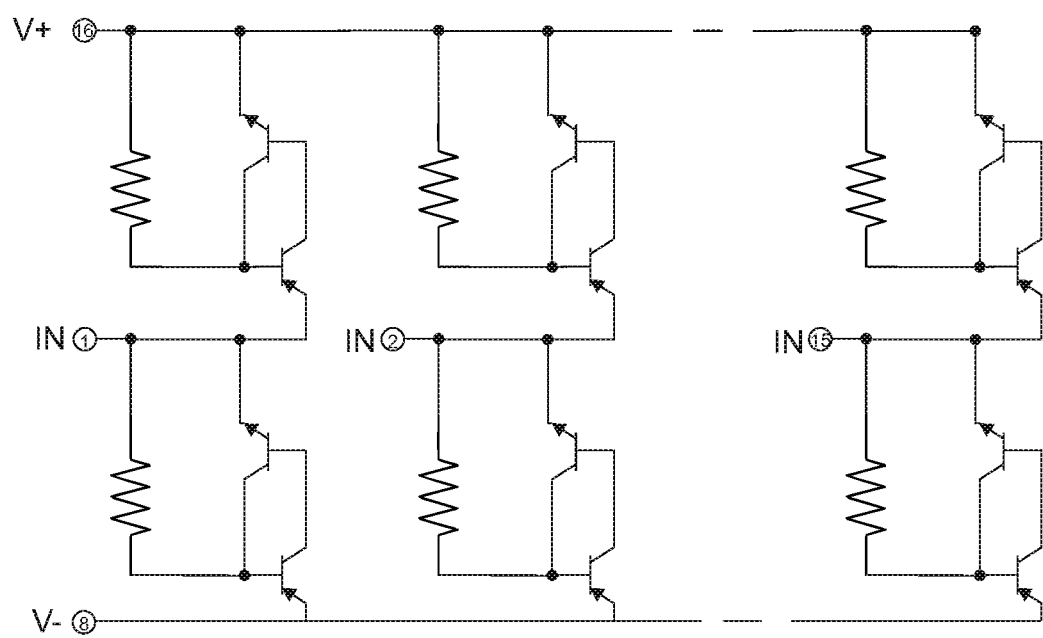
FIG. 3 is a functional block diagram of an exemplary electrostatic discharge circuit.

FIG. 2 shows an example of an electrostatic discharge circuit embodied as an integrated circuit chip having 16 pins. Such integrated circuit chips configured as an electrostatic discharge circuit are commercially available. FIG. 3 shows an example schematic of the integrated circuit of FIG. 2. Other circuit configurations which cause a statically charged individual to discharge so as to avoid an electrostatic shock can also be used.

Damage to electronics as a result of an electrostatic shock can also be avoided if a user is discharged prior to using an electronic device which may function as a conductor and have the electrostatic charge of the user dissipate therethrough. Further, sparks resulting from a sudden electrostatic discharge can cause gasoline or other flammable substances to ignite, which is especially problematic at gas stations. When an occupant of the vehicle exits the vehicle in order to fill the tank of the vehicle at a gasoline pump and slides across the seat, the driver may become charged. If an electrostatic shock then occurs in the vicinity of the gasoline to be filled into the gas tank of the vehicle, the gasoline can ignite and cause a dangerous and life threatening situation with a fire at pumps of the gas station.

A plurality of conductive surfaces may also be arranged at various locations which an occupant is likely to contact while seated or while entering and exiting the vehicle. The occupant or user may be a passenger or a driver of the vehicle.

With the placement of the conductive surface or surfaces at strategic locations which, for example, an occupant of a vehicle is likely to contact while exiting or entering a vehicle, the occupant does not have to contact ground, for example by touching the chassis of the car, while sliding across the seat to exit or enter the vehicle. Further, the user of the vehicle does not need to take any other preventive measures of his own to avoid an electrostatic shock, such as applying a static guard spray to various vehicle surfaces.

Figure 4:
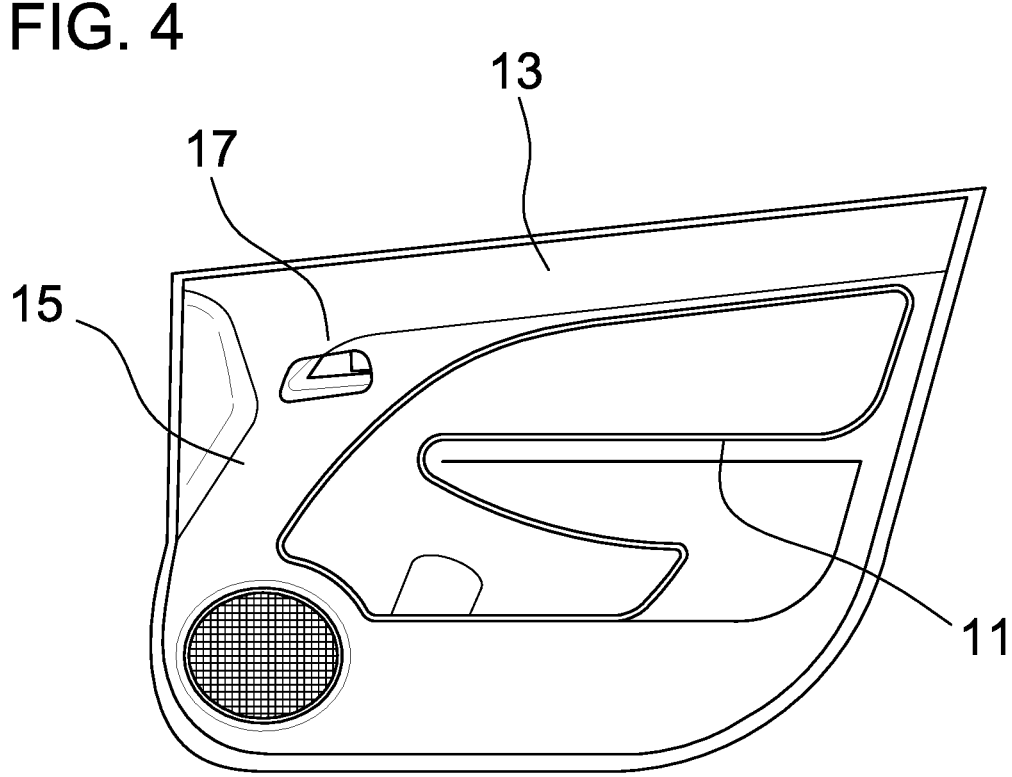
FIG. 4 shows an interior door panel of a vehicle which includes conductive surfaces connected to an electrostatic discharge circuit.
Figure 5:
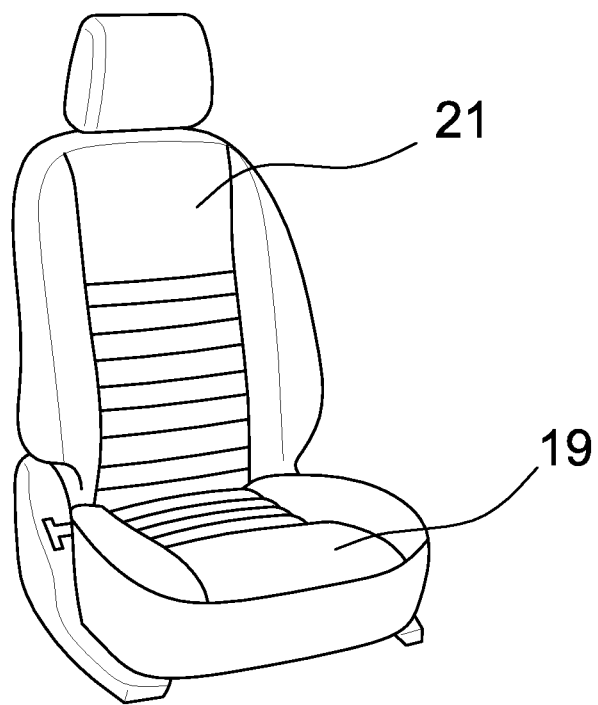
FIG. 5 shows a vehicle seat which includes conductive surfaces connected to an electrostatic discharge circuit.

FIGS. 4 to 7 show various exemplary parts of a vehicle which can be made of a conductive material or have a conductive material applied thereto which in turn is connected to the electrostatic discharge circuit. FIG. 4 shows the interior of a vehicle door. The vehicle door includes several surfaces which can be provided as conductive surfaces 1 such as, for example, an arm rest 11, the top portion of the vehicle door 14, the area around the door handle 15, and the interior door handle 17 itself. FIG. 5 shows a vehicle seat which can also be provided with conductive surfaces 1 connected to a dissipative circuit 5, for example, on the back rest 21 and/or on the top portion of the seat cushion 19.

Figure 6:
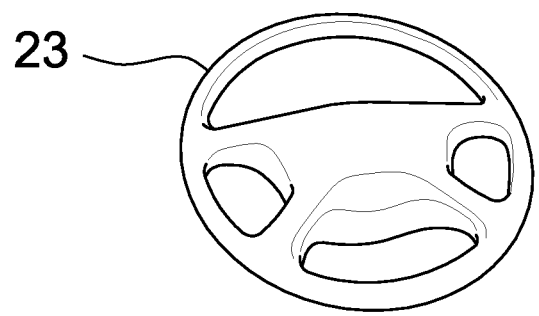
FIG. 6 shows a steering wheel which includes conductive surfaces connected to an electrostatic discharge circuit; and, FIG. 7 shows a door handle of an automobile which includes conductive surfaces connected to an electrostatic discharge circuit.
Figure 7:
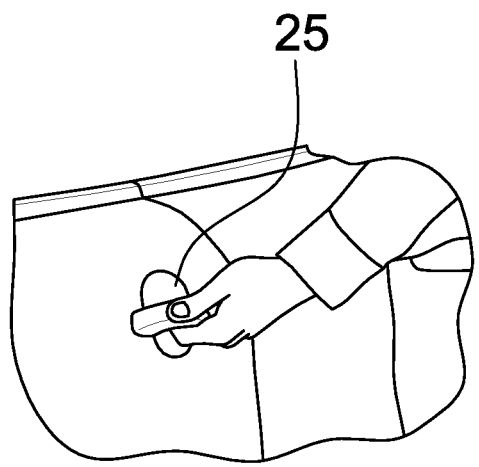

FIG. 6 shows a steering wheel 23 which can provide a conductive surface 1 and FIG. 7 shows an exterior door handle 25. The door handle 25 itself and the area around the door handle can, for example, be provided with a conductive surface 1. Other vehicle surfaces including surfaces shown in FIGS. 4 to 7 can be provided as conductive surfaces 1.

The foregoing description of the embodiments and examples has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

LIST OF REFERENCE CHARACTERS

| | |
|---|---|
| Conductive surface | 1 |
| Connecting line | 3 |
| Dissipative circuit | 5 |
| Connecting line | 7 |
| Ground | 9 |
| Arm rest | 11 |
| Top portion of a vehicle door | 13 |
| Area around door handle | 15 |
| Interior door handle | 17 |
| Seat Cushion | 19 |
| Back rest | 21 |
| Steering Wheel | 23 |
| Exterior door handle | 25 |

What is claimed is:

1. An electrostatic shock reduction system for a vehicle having a plurality of surfaces contactable by a user, the electrostatic shock reducing arrangement comprising:
    a plurality of conductive surfaces being made of a conductive material;
    a discharge circuit connected to the plurality of conductive surfaces;
    the discharge circuit comprising a plurality of individual discharge circuits connected in parallel, wherein each individual discharge circuit has an input connected to one of the plurality of conductive surfaces, a positive supply voltage and a negative supply voltage;
    said discharge circuit being configured to slowly discharge electrostatic charge of the plurality of conductive surfaces.

2. The electrostatic shock reducing system of claim 1, wherein the plurality of conductive surfaces are located on interior surfaces of the vehicle.

3. The electrostatic shock reducing system of claim 1, wherein:
    the plurality of conductive surfaces comprise a steering wheel, a seat, a door, a shift stick, and a door handle.

4. The electrostatic shock reducing system of claim 1, wherein the vehicle includes a keyhole, and wherein the conductive surface is arranged on the keyhole.

5. The electrostatic shock reducing system of claim 1, wherein the conductive surface is arranged at a location which the user is likely to contact while seated, while entering or while exiting the vehicle.

6. The system of claim 1, wherein the individual discharge circuit comprises a first circuit comprising a first and second transistor, wherein a base of the first transistor is connected to a collector of the second transistor, a base of the second transistor is connected to a collector of the first transistor, an emitter of the first transistor is connected the one of the plurality of conductive surfaces and an emitter of the second transistor is connected to a supply voltage, wherein the first circuit is configured to slowly drive the one of the plurality of conductive surfaces to the connected supply voltage.

7. The system of claim 1, further comprising a second circuit comprising a first and second transistor, wherein a base of the first transistor is connected to a collector of the second transistor, a base of the second transistor is connected to a collector of the first transistor, an emitter of the first transistor is connected the one of the plurality of conductive surfaces and an emitter of the second transistor is connected to a second supply voltage, wherein the first circuit is configured to slowly drive the one of the plurality of conductive surfaces to the connected second supply voltage.

8. The system of claim 1, wherein only one of the first circuit and the second circuit is active based on a voltage of the one of the plurality of conductive surfaces.

9. The system of claim 1, further comprising a plurality of connecting lines to connect the plurality of conductive surfaces to the discharge circuit and a ground connecting line to connect the discharge circuit to a vehicle ground.

10. The system of claim 1, wherein the number of the plurality of conductive surfaces connected to individual inputs of the discharge circuit is 16.

11. An electrostatic shock reducing system for a vehicle having a plurality of surfaces contactable by a user, the electrostatic shock reducing arrangement comprising:
    a conductive surface having a conductive material;
    a discharge circuit connected to said conductive surface; and,
    said discharge circuit being configured to slowly discharge the conductive surface.

12. The electrostatic shock reducing system of claim 11, wherein the conductive surface is an exterior door handle.

13. The electrostatic shock reduction system of claim 11, wherein said discharge circuit is connected to a vehicle ground.

14. A vehicle comprising:
a plurality of surfaces contactable by a user;
at least one of said plurality of surfaces including a conductive material so as to form a conductive surface;
a discharge circuit connected to said conductive surface configured to slowly discharge said conductive surface.

15. The vehicle of claim 14, wherein the conductive surface is an interior surface of the vehicle.

16. The vehicle of claim 14, wherein:
the conductive surface is one or more of a steering wheel, a seat, a door, a shift stick, and a door handle.

17. The vehicle of claim 14, wherein the vehicle includes at least one of a keyhole and an outer surface, and wherein the conductive surface is arranged on at least one of the at least one of a keyhole and an outer surface.

18. The vehicle of claim 14, wherein the discharge circuit further comprises a resistor array with dissipative material and/or active components.

19. The vehicle of claim 14, wherein the conductive surface is arranged at a location which the user is likely to contact while seated, while entering or while exiting the vehicle.

* * * * *